Jan. 3, 1956 C. E. IMPEY ET AL 2,729,396
ELECTRONICALLY REBALANCED TEMPERATURE SENSING BRIDGE
Filed Sept. 12, 1951
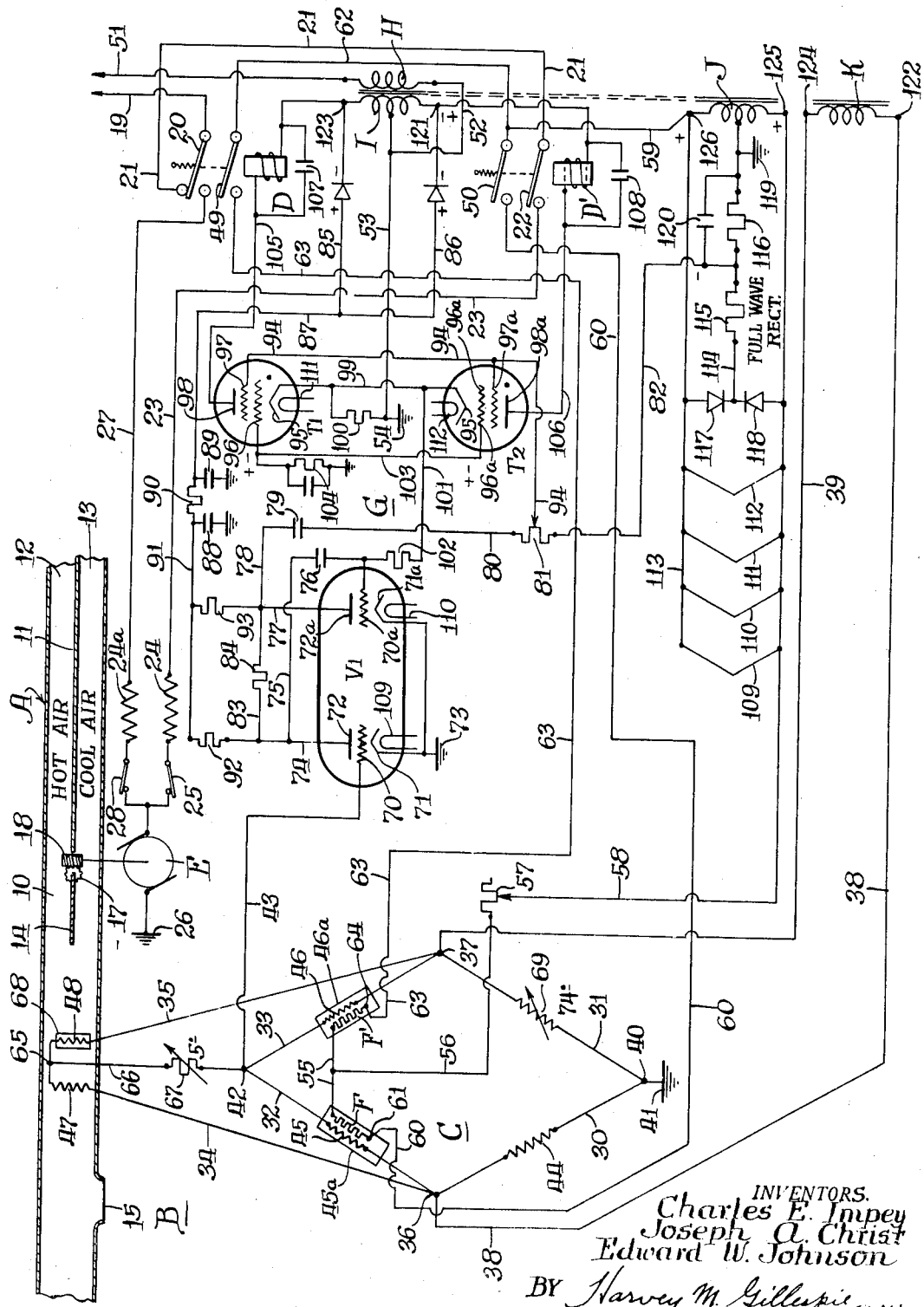
INVENTORS.
Charles E. Impey
Joseph O. Christ
Edward W. Johnson
BY Harvey M. Gillespie
Atty.

United States Patent Office 2,729,396
Patented Jan. 3, 1956

2,729,396

ELECTRONICALLY REBALANCED TEMPERATURE SENSING BRIDGE

Charles E. Impey, Brookfield, and Joseph A. Christ and Edward W. Johnson, Chicago, Ill., assignors to Vapor Heating Corporation, Chicago, Ill., a corporation of Delaware Application September 12, 1951, Serial No. 246,188

14 Claims. (Cl. 236—68)

This invention relates to a temperature control system in which an electrical bridge, utilized as a temperature sensing element, becomes unbalanced under the influence of deviations in temperature from a desired condition.

A principal object of the invention is to provide, in a temperature control system of the above character, improvements whereby the bridge, being unbalanced in response to a deflection in temperature from a pre-selected value, may be recurrently rebalanced during the continuance of said temperature deflection.

Another object of the invention is to provide improved means adapted to function, when the bridge is unbalanced by a deviation of temperature from a pre-selected or otherwise desirable condition, to vary the effectiveness of a temperature altering device so as to remove the temperature deviation and thereby rebalance the bridge.

The invention includes as a further and more specific object the provision of improvements in an electronically controlled temperature sensing bridge, whereby the bridge is momentarily rebalanced intermittently during the continuance of a temperature deflection tending to unbalance the same and whereby this cycling of the bridge is utilized to effect a series of adjustments to a means for correcting said temperature deflection and thereby rebalance the bridge.

According to the present invention, a temperature sensing bridge, provided in one or more of its arms with resistance elements which are highly sensitive to temperature changes, is energized by a suitable source of electrical energy and is so adjusted that all arms of the bridge are in perfect electrical balance when a desired temperature condition is maintained. In the event of a temperature deviation of a predetermined value away from the desired temperature condition, the bridge becomes unbalanced and this unbalanced condition is utilized to activate electronically controlled means for rebalancing the bridge.

The present invention provides means whereby the bridge may be rebalanced in either of two ways. For example, by producing, in another portion of the bridge, a resistance variation corresponding in value to the resistance variation produced by the existing temperature deflection or by so altering the unbalancing temperature influence on the bridge as to remove the temperature deflection. In order to rebalance the bridge by producing resistance variation therein to offset the resistance due to the existing temperature deflection, electrical heaters are associated with selected portions of the bridge. When the bridge is unbalanced by a temperature deflection which varies the resistance of one portion of the bridge relative to another portion thereof, the bridge may be rebalanced by altering the temperature of an opposing portion of the bridge to produce a corresponding resistance variation therein. When the bridge is rebalanced by correcting the temperature deflection affecting the bridge, this correction is obtained by appropriately varying the effectiveness of the temperature altering device so as to increase or decrease its heating or cooling function, as may be required to remove said temperature deflection.

A transformer comprising a primary and three secondary coils, wound about a common core, is utilized as a power source for the bridge and for the electronic control elements of the system. A junction of the arms forming one branch of the bridge is grounded and the opposite sides of the bridge are connected to opposite ends of one secondary winding of the transformer. Another secondary coil of the transformer is connected by a center tap to ground and has its opposite ends connected through separate control relays with an output point of the bridge. An electronic amplifier, interposed in the connection between the output point of the bridge and the said relays, includes a voltage amplifier and a pair of electronic tubes which, in addition to functioning as power amplifiers also function as phase selectors or switches to selectively control the energization of the relays in relation to increases and decreases in the resistance of portions of the bridge. The selective control of the said relay is obtained by virtue of the connection of one relay and its associated phase selector tube with one end of its associated secondary winding of the transformer, whereby it will function in response to an unbalanced condition of the bridge produced by a decrease in resistance of one side thereof. The other relay and its associated phase selector tube are connected to the other end of said secondary winding and thereby respond to an unbalanced condition of the bridge resulting from an increased resistance in the last mentioned side of the bridge.

When the bridge is unbalanced a voltage appears at the output point thereof and the voltage is impressed on a grid element of an electronic voltage amplifier. The signal thus amplified is directed through an electronic power amplifier and thence to energize a selected relay which functions to close an energizing circuit through one of said electrical heater and thereby rebalance the bridge. However, when the bridge is rebalanced by the energization of an electrical heater, such rebalanced condition is maintained only momentarily, since the rebalancing of the bridge deactivates said electronic amplifier and therefore deenergizes the relay for energizing the said electrical heater. This momentary rebalancing action reoccurs intermittently during the continuance of the temperature deflection tending to bias the bridge to an unbalanced condition and therefore creates a so-called cycling action of the bridge. The cycling of the bridge produces intermittent activation of the electronic amplifier and the relays controlled thereby and this intermittent action is utilized to modulate the effectiveness of a temperature altering device so as to restore the ambient temperature effect on the bridge to the normal control level and thereby rebalance the bridge.

In addition to the provision of one or more temperature sensitive resistors adapted to respond to temperature deflections within an enclosed space or zone whose temperature is to be controlled, the improved system includes other temperature sensitive resistors, for example, a pair of such resistors interposed in the bridge and positioned to respond to abrupt changes in the temperature of the heating and cooling media delivered into the enclosure. In this connection one of the said resistors is partially shielded from the temperature of said media so as to lag in its response to said abrupt temperature changes. The lag effect thus produced creates an unbalanced condition in the bridge and therefore effects an adjustment of the temperature altering device in a direction to correct the said abrupt temperature variation.

In order to avoid activating the system in response to minor deviations in temperature, means are provided whereby the bridge is rendered ineffective to activate the electronic amplifier until the temperature deviation is of a predetermined value, that is to say, a value corresponding to the upper or lower limits of a pre-selected temperature control band. The invention also includes adjustable means whereby the spacing between the upper and lower limits of the temperature control band may be varied and other means whereby the temperature band as a whole may be raised or lowered as may be desired.

A preferred embodiment of our improved control system is illustrated in the accompanying drawing as comprising a temperature altering device, designated generally by the reference letter A and adapted to heat or cool an enclosure B; a temperature sensing bridge C whose resistance becomes unbalanced by the effect of temperature changes on localized portions thereof; a pair of relays designated D, D' for closing energizing circuits through an actuator E associated with said temperature altering device A, and for closing energizing circuits through a pair of electrical heaters F, F' associated with selected parts of the bridge C, and electronic means, designated as a whole by the reference letter G, connected in the circuit between the bridge A and the relays D, D' and functioning to selectively control the energization of said relays in response to unbalanced conditions of the bridge resulting from increases and decreases in the resistance of opposing parts of the bridge.

Temperature altering device

The temperature altering device A, for the purpose of convenience of illustration, is shown diagrammatically herein as an air blending device comprising a conduit 10 divided by a partition 11 into a hot air duct 12 and a cool air duct 13. A damper 14 is pivotally supported at one end and is illustrated in a position whereby equal amounts of heated and unheated air are blended and delivered through an outlet 15 into the enclosed space B whose temperature is being controlled. It should be understood, however, that various other temperature altering devices may be used, the type of such device being determined largely by engineering factors and character of the enclosure, thing or surface whose temperature is to be controlled.

Damper actuator

The damper 14 is operatively connected by means of conventional driving connections 17 and 18 to the actuator E, for example a reversible electric motor. The motor is adapted when rotated in one direction to move the damper 14 in a direction to close or partially close the cool air duct 13 and thereby proportionately increase the effectiveness of the heated air delivered. When the motor E rotates in a reverse direction, the damper 14 is moved in a direction to close or partially close the hot air duct 12 and thereby proportionately increases the cooling effect of the unheated air being blended with the heated air. The energizing circuit for operating the motor E in the direction to reduce the heating effect leads from a positive line 19 through a de-energized closed contact 20 of relay D, conductor 21 to energized closed contact 22 of relay D' and thence through the conductor 23 and motor field winding 24 and limit switch 25 through the armature of the motor E and thence to the ground 26. The energizing circuit for reversing the direction of the motor E to operate the damper 14 in a direction to increase the heating and reduce the cooling effect of the temperature altering device A, leads from the said positive line 19 through the energized closed contact 20 of relay D, conductor 27, motor field winding 24ª, closed limit switch 28 and thence through the motor armature E to the ground 26.

The limit switches 25 and 28 are shown diagrammatically, but it will be understood that they are moved in a well-known conventional manner to their open positions by the movement of the armature of motor E; the switch 25 being opened only when the damper 14 reaches its position for producing a maximum cooling effect, and the limit switch 28 being opened only when the damper 14 reaches a position for maximum delivery of heat.

Temperature sensing bridge

The temperature sensing bridge is composed of a plurality of branches of two arms each. One arm of the bridge is provided with a variable resistor which is not influenced by temperature changes to any appreciable extent, but all other arms of the bridge are provided, in each case, with a highly sensitive temperature resistor. The number of bridge branches may be varied to accommodate the number of temperature sensitive resistors desired to be used. However, for the purpose of illustrations, the present embodiment is composed of three branches. One branch comprises the arms 30, 31; another branch includes arms 32, 33; and the third branch is composed of arms 34, 35. The several arms constituting opposite sides of the bridge are connected at junctions 36, 37, and these junctions are connected, by connectors 38, 39, to a suitable source of power, and the junction 40 of the arms 30, 31 is connected to the ground as indicated at 41. The arms 30, 32, 33, 34 and 35 are provided with resistors 44, 45, 46, 47 and 48, respectively, all of which have, preferably, a high negative temperature co-efficient of resistance and the arms in which said resistors are interposed have equal resistance. The resistors 45, 46 are enclosed in suitable housing 45ª, 46ª so as to hold heat within the housing for a short period of time. An electrical heater F, having a predetermined heating value, for example 2°, is enclosed in the housing with the resistor 45, and a second electrical heater F' of like value is enclosed in the housing 46ª with the resistor 46. These electrical heaters are connected through energized closed contacts 49, 50 of said relay D, D' and are energized to effect momentary rebalance of the bridge in the manner hereinafter described.

Transformer

The source of power for energizing the bridge and the electronic elements of the system is a transformer comprising a primary coil H and three secondary coils I, J and K, all of which are wound on a common core. The primary coil H of the transformer has one end connected to a main power line 51 and the other end is connected by conductors 52, 53 to the ground 54. The conductor 53 serves also as a center tap for connecting the center of the transformer secondary winding I to the ground at 54. The opposite ends of the secondary winding are connected through windings of relays D, D' to the electronic control elements. The bridge is energized by the secondary winding K of the transformer; one end of this secondary being connected by said conductor 38 to the junction 36 of the arms 30, 32 and 34, forming one side of the bridge and the other end of secondary winding K is connected by said conductor 39 to the junction 37 of the arms 31, 33 and 35 forming the other side of the bridge. The secondary winding J serves as the source of energy for the electrical heaters F, F'. In this connection, similar ends of both heaters F, F' are connected by common conductors 55, 56, variable resistor 57 and conductor 58 to one end of the transformer secondary winding J. The other end of this secondary winding is connected through conductor 59, energized closed contact 50 of relay D' and conductor 60 to the end 61 of electrical heater F. The same end of said transformer winding J is connected by conductors 59, 62, closed contact 49 of relay D and conductor 63 to the end 64 of electrical heater F', that when relay D' is energized closed, the electrical heater F is energized to apply heat to the temperature sensitive resistor 45. Likewise, when the relay D is energized the electrical heater F' is energized to apply heat to the temperature sensitive resistor 46. The heating value of both electrical heaters F and F' may be varied by the adjustment of the variable resistor 57. When the variable resistor 57 is adjusted to the position shown in the drawing, each electrical heater F, F' will have a maximum heating value of 2°. The temperature sensitive resistors 47 and 48 are positioned in the air duct 10 so as to respond to the temperature of the air being delivered into the space B and the junction 65 of the arms 34, 35 is connected through the connector 66 and variable resistor 67 to the output point 42 of the bridge. The temperature sensitive resistor 48 is housed or otherwise shielded, as indicated at 68, from the direct influence of the temperature of said air so that its response to the air temperature will lag relative to the response of the resistor 47. By reason of the lag response of the resistor 48 relative to the response of resistor 47, the resistor 47 will promptly respond to any abrupt deflections of temperature in the air being delivered. Such abrupt deflection in the temperature of delivered air, if it is at or above a selected value determined by the adjustment of resistor 67, results in unbalancing the bridge and, therefore, produces activation of the electronic amplifier and the relay D or D', as the case may be, to adjust the position of the damper 14 to compensate for the said abrupt temperature deflection. The adjusted position of the variable resistor 67 eliminates the effect of all abrupt temperature deflections below a value of 5°.

Referring again to the bridge branch composed of arms 30 and 31: The arm 31 has interposed therein the variable resistor 69 adapted to be adjusted to vary the resistance of arm 31 relative to arm 30. The resistor 69, as herein previously indicated, is not influenced to any appreciable extent by temperatures within the range dealt with herein and, therefore, provides a simplified means for adjusting the temperature setting of the bridge as a whole. When the resistor 69 is adjusted to establish a temperature setting for the bridge, any deflection of the temperature within the space B will produce a proportional variation in the resistance of temperature sensitive resistor 44 in the bridge arm 30 and, therefore, unbalance the bridge. Such unbalanced condition of the bridge results in a voltage appearing at the output point 42. This voltage is impressed by conductor 43 on a grid 70 of a vacuum tube $V_1$, constituting a part of the electronic means G.

Electronic control means

The electronic control means includes the vacuum tube $V_1$, which functions as a voltage amplifier, and two thyratron tubes T1 and T2 which function as power amplifiers and phase selectors.

The vacuum tube $V_1$ is preferably of the form in which two sets of triode elements are enclosed in a single envelope and are cooperatively connected so as to function as a two-stage voltage amplifier. The elements of the tube $V_1$ comprise two grids 70, 70$^a$, two indirectly heated cathodes 71, 71$^a$, and two plates 72, 72$^a$. The cathodes are both connected to ground at 73. The plate 72 is connected through conductors 74, 75, and coupling condenser 76, to the grid 70$^a$ and from there to the ground 54 through resistor 102, conductor 101, conductor 99, and resistor 100. The plate 72$^a$ is connected, through conductors 77, 78, coupling condenser 79 and conductor 80, to one end of a variable resistor 81. The other end of the resistor 81 is connected to ground through a bias voltage supply as will be explained later. The plate 72 is also connected, through conductors 74, 83 and negative feed back resistor 84, with the plate 72$^a$. The appropriate voltage for plate 72, 72$^a$ is established by connecting them to both ends of the transformer secondary I. This connector includes rectifier branches 85, 86 leading from opposite ends of said transformer secondary to a common conductor 87, filter network comprising condensers 88, 89 and resistor 90, conductor 91 and resistor 92 to plate 72 and by said conductor 91 and resistor 93 to plate 72$^a$. The slide 94 of variable resistor 81 is connected by conductor 95 to the shield grid of each thyratron tube T1 and T2. These tubes are of identical construction. The elements of tube T1 comprise an indirectly heated cathode 95, a control grid 96, a shield grid 97, and a plate 98. The like elements of the tube T2 are designated 95$^a$, 96$^a$, 97$^a$ and 98$^a$, respectively. The cathods 95, 95$^a$ are connected to each other by conductor 99 which is connected through a resistor 100 to the ground at 54. The control grids 96, 96$^a$ are connected to each other by conductor 103, the latter of which is connected to ground by a connection comprising a resistor 104 and a condenser connected in shunt therewith. The plate 98 of tube T1 is connected by conductor 105 through the induction winding of relay D to one end of the transformer secondary winding I. The plate 98$^a$ of the tube T2 is connected by conductor 106 through relay D' to the other end of said transformer secondary winding I. A condenser 107 is connected in shunt with the induction winding of relay D and a similar condenser 108 is connected in shunt with the induction winding of relay D'. The filaments for heating the cathode of the tube $V_1$ are designated 109, 110 and the filaments for heating the cathode of tubes T1 and T2 are designated 111 and 112. All of the said filaments are connected in parallel relative to each other in a circuit comprising conductor 58 connected to one end of the transformer secondary winding J and conductor 113 connected to the other end of said transformer secondary J. A full wave rectifier composed of two halves, 117 and 118 is connected across the conductors 58 and 113, connector 114 leading from the center tap of said rectifier through dividing resistors 115, 116 to ground 119; which is also connected to a center tap of transformer secondary winding J. Conductor 82 is connected between voltage dividing resistors 115, 116 to pick up a direct current bias voltage which is impressed on the thyratron screen grids 97, 97$^a$ through variable resistor 81 and conductor 94. Condenser 120 is connected in parallel with resistor 116 to eliminate any alternating current voltage that may appear on conductor 82.

From the above it will be seen that the shield grids of thyratrons T1, T2 are biased to determine the amount of signal from plate 72$^a$ of tube $V_1$ which will cause the thyratron to begin conducting, and that this bias can be varied by adjustment of the slide wire on variable resistor 81.

It will also be observed that the thyratron tubes T1 and T2 are 180° out of phase by virtue of the connections of their respective plates 98 and 98$^a$ to opposite ends of the transformer secondary I. Inasmuch as the transformer secondary windings I, J and K are wound about a common core, the end 121 of the transformer secondary I to which the plate 98$^a$ of thyratron T2 and the relay D' is connected, will be in phase with the end 122 of the transformer secondary K connected to the junction 36 at one side of the bridge. It would also be apparent that the end 123 of the transformer secondary I, to which the plate 98 of thyratron T1 and the induction winding of relay D is connected, will be in phase with the end 124 of transformer secondary K which is connected to the junction 37 at the other side of the bridge. Consequently, a voltage appearing at the output point of the bridge in response to a decrease in the resistance of the temperature sensitive resistor 44 will result in activating the thyratron T2 to energize and thereby close the relay D' so as to effect appropriate adjustments of the system to decrease the heating effects of the temperature altering device A. If the voltage appearing at the output point 42 of the bridge results from an increase in the resistance of resistor 44 (which condition amounts, in effect, to an effective decrease in resistance of resistor 69), the said voltage will be in phase with the thyratron T1 and will be impressed on its screen grid 97 and thereby effect energization of the relay D so as to effect appropriate adjustments of the system to increase the heating effect of the temperature altering device A.

The temperature sensitive resistors of the bridge network are highly sensitive to temperature changes. Consequently, the bridge will be unbalanced by very slight temperature deflections from the balanced setting of the bridge as determined by the adjustment of the variable resistor 69. In order to avoid a performance of control operations in response to minor deflections of temperature the variable resistor 81 is interposed in the connector 80 between the coupling condenser 79 and thyratron grids 97, 97ª. While the said variable resistor 69 in the arm 31 of the bridge is adjusted to maintain balance of the bridge at a selected temperature, the variable resistor 81 functions to control the extent of unbalance in the bridge required to effect control operations of the system. In other words, the resistor 81 may be adjusted to establish the upper and lower limits of a temperature control band. For purpose of illustration, it may be assumed that the adjusted position of the slide 94 on variable resistor 81, shown in the drawing, defines a temperature control band of 2°, that is to say, 1° deflection below the temperature setting of the bridge and 1° above the temperature setting of the bridge. However, the spacing between the upper and lower limits of the temperature band may be increased by movement of the slide 94 downwardly to increase the effected resistance of conductor 80. If the slide 94 is moved in a direction to reduce the resistance in conductor 80, such adjustment serves to reduce the width of the temperature control band.

Operation

In connection with a description of the operation of the system, let it be assumed that the variable resistor 69 is so adjusted that the bridge will balance at a temperature of 74° within space B and that the space is standing at that temperature. Let it be assumed also that the variable resistor 67 is adjusted to take into account abrupt variations of 5° in the temperature of the delivered air and that the variable resistor 57 is adjusted to provide maximum heating effect of 2° for each electrical heater F, F' and that the resistor 81 is adjusted to provide a temperature control band of 2°, that is to say, a band having an upper limit of 75° and a lower limit of 73°.

Under the above assumed conditions, there would be no control adjustments of the system so long as the temperature of the air delivered is maintained at a uniform rate and so long as the temperature of the enclosed space stands between the upper and lower limits of the temperature control band, between 73° and 75°. However, if the space temperature should rise to 78°, such temperature being above the upper limit (75°) of the temperature control band and also outside the 2° heating effect of the electrical heater F, the voltage appearing at the output point 42, as a result of this unbalanced condition of the bridge, is impressed by conductor 43 on the grid 70 of the tube V₁ and the amplified voltage is immediately impressed on the grid 70ª of said tube V₁ through conductor 75 and coupling condenser 76. Inasmuch as the initial voltage appearing at the output 42 of the bridge, as a result of an unbalanced condition due to decrease in the resistance of the negative temperature co-efficient resistor 44, the original voltage and its amplification is in phase with the thyratron T2. Consequently, the amplified voltage is impressed on the screen grid 97ª of thyratron T2 through the conductor 78, coupling condenser 79, conductor 80, temperature band control resistor 81 and conductor 94. The function of thyratron T2 energizes relay D' through the conductor 106 which connects with the end 121 of transformer secondary I, the circuit continuing through the secondary I to the ground tap 53 and thence to the cathode 95 through resistor 100 and conductor 99, completing the circuit back to the plate 98.

The energization of relay D' closes its contacts 22 and 50. The closing of contact 22 directs an energizing circuit through the motor E to adjust the damper 14 in a direction to reduce the volume of heated air delivered and, therefore, increase the effectiveness of the cool air. Inasmuch as the temperature within the space B stands at 78°, this being 3° above the upper limit of the assumed temperature control band, the motor E will continue its operation until the temperature in space B drops to 77°, at which point cycling resistor 45 rebalances the bridge in the following manner:

The said heater F is energized simultaneously with the energization of the motor E by the closing of contact 50 of relay D'. This circuit leads from the end 125 of the transformer secondary J through wire 58, variable resistor 57 and wires 56 and 55 through the heater F and thence through conductor 60, closed contact 50 of relay D and conductor 59 to the other end 126 of said transformer secondary J. However, the application of the 2° of auxiliary heat to the temperature sensitive resistor 45 is insufficient to rebalance the bridge while the temperature of the space stands above 77°. However, when the temperature within space B is lowered to 77° the decreased resistance of resistor 45, due to the 2° of auxiliary heat applied, is sufficient to offset the said increased resistance in resistor 44 and thereby rebalances the bridge. This rebalanced condition of the bridge is of short duration since the rebalancing of the bridge results in deenergizing the relay D' and, therefore, opens the circuit through heater F, whereupon the bridge is again unbalanced as soon as the effect of the auxiliary heat is dissipated. This recurrent balancing and unbalancing of the bridge by the application and removal of heat from the resistor 45 will continue until the temperature of the enclosed space B rises above the upper limit (75°) of the temperature control band. Inasmuch as the actuator is moved by small increments each time the bridge is unbalanced and is stopped when the bridge is balanced the damper will have assumed a new position when the temperature of the space B reached 75°, thereafter the damper will maintain its last adjustment until the temperature of the space B falls below the lower limit (73°) of the temperature control band. When this condition occurs the bridge becomes unbalanced because of an increase in the resistance of resistor 44, thereby constituting, in effect, a decrease in the bridge arm 31. Therefore, under such conditions, the voltage appearing at the output 42 of the bridge will be in phase with the thyratron T1. Consequently, this voltage, when amplified as previously described, is impressed on the screen grid 97 of thyratron T1 and thereby produces energization of the relay D to close its contacts 20 and 49.

When the relay contact 20 is energized closed it establishes a circuit through motor E to impart movement to the damper 14 in a direction to open the hot air duct 13 and thereby increases the heating effect of the temperature altering device A. This circuit includes the main supply lead 19, energized closed contact 20 of relay D, conductor 27, motor field 24ª, limit switch 28, and the motor armature to the ground 26. Simultaneously with the said reverse energization of motor E, the closing of contact 49 of relay D closes an energizing circuit through heater F', whereby the auxiliary heat thus applied to the temperature sensitive resistor 46 reduces its resistance. This heater circuit leads from the end 125 of transformer secondary winding J through conductor 58, variable resistor 57 and conductors 56 and 55 through heater F' and thence through conductor 63, energized closed contact 49 of relay D and conductors 62 and 59 to the end 126 of said transformer secondary J.

Inasmuch as auxiliary heat is applied to the bridge resistor 46 simultaneously with the reverse actuation of motor E—assuming that the temperature deflection above the lower limit of the temperature control band is less than 2°—such reverse actuation of motor E will be only momentary and will, therefore, effect only a slight adjustment of the damper 14 in a direction to increase the heating effect of device A, since the rebalancing of the bridge will de-energize the relay D and, therefore, open the heating circuit through auxiliary heater F', whereupon the bridge will become unbalanced by the dissipation of said auxiliary heat. This cycling action of the bridge will continue until the damper 14 is adjusted to a position to maintain the temperature of the enclosure B within the upper and lower limits of the temperature control band.

Both limit switches 25 and 28 remain closed so long as the damper is in an intermediate position, the switch 25 being opened only when the damper moves to a position to completely close the cool air duct 13 and the limit switch 28 being opened only when the damper moves to a position to completely close the hot air duct 12.

Referring now to the control function of the control device in response to abrupt temperature deflections of the air within the duct 10: The bridge arms 34 and 35, including the temperature sensitive resistance elements 47 and 48, are constructed to balance when both resistors 47 and 48 have attained the same temperatures. By reason of the shield 68 associated with the resistor 48, the responses of this resistor to abrupt changes in temperature will lag relative to the responses of the resistor 47. However, if the acceleration or deceleration of the air temperature in duct 10 persists for any appreciable period, the resistor 48 will attain the same temperature as resistor 47, and, therefore, balance the bridge arm 35 with relation to the bridge arm 34. The variable resistor 67 interposed in the connection 66 between the junction 65 of arms 34, 35 and the output 42 of the bridge makes it possible to control the amount of temperature deflection necessary to unbalance the bridge.

When the arms 34, 35 are unbalanced as a result of abrupt decline in the temperature of the air in duct 10, the resistance of resistor 47 is increased with relation to the resistance of the resistor 48 and, therefore, sets into operation the means hereinbefore described for adjusting the damper 14 to offset said abrupt change in the temperature of the air delivered. As a normal operation, the damper 14 will be moved to one or the other extreme positions in response to an abrupt temperature change within the duct 10. If the change results from an increase in temperature the damper will close the hot air duct 12. If the temperature change is a result of an abrupt decrease in temperature the damper 14 will be moved to a position to close the cool air duct 13. In either event, the auxiliary heat will be applied to one or the other of the temperature sensitive resistors 45, 46, as previously described, so as to re-adjust the damper 14 to a proper position for maintaining the temperature within the enclosure B within the upper and lower limits of the temperature control band.

We claim:

1. A temperature control system comprising, in combination, a temperature sensing bridge composed of a plurality of arms of equal electrical resistance, an electrical power source connected to opposite sides of the bridge, a temperature sensitive resistor interposed in one of said arms and responsive to deflections in the temperature being controlled to vary the resistance of said arm relative to the other arms of the bridge and thereby unbalance the bridge, a temperature altering means including an actuator therefor for progressively adjusting the same to counteract the temperature deflections in the temperature being controlled, a temperature sensitive resistor interposed in another arm of the bridge, an electrical heater for applying heat to the last mentioned resistor to produce resistance variation therein to offset the effect of the resistance variation in the first mentioned resistor and thereby momentarily rebalance the bridge, electrically energized circuit closing means for energizing said heater and said actuator, and means including an electronic switch connected in circuit with an output point of the bridge and effective during an unbalanced condition in the bridge for controlling the energization of said circuit closing means, whereby the recurrent balanced and unbalanced condition of the bridge and the consequent momentary energization and de-energization of said actuator progressively varies the effectiveness of the temperature altering means to remove the said deflection in the temperature being controlled.

2. A temperature control system as defined in claim 1 characterized in that both said resistors have a high negative temperature coefficient of resistance.

3. A temperature control system as defined in claim 2 characterized in that both said resistors are interposed in arms at one side of the bridge, whereby the heat applied to the second resistor produces resistance variations therein to counteract resistance variations in the first mentioned resistor resulting from an increase in the temperature being controlled.

4. A temperature control system as defined in claim 2 characterized in that the said resistors are interposed in arms at opposite sides of the bridge, whereby the heat applied to the second mentioned resistor produces resistance variations therein to counteract resistance variations in the first mentioned resistor resulting from a decrease in the temperature being controlled.

5. A temperature control system comprising, in combination, a temperature sensing bridge composed of a plurality of arms of equal electrical resistance defining opposite sides of the bridge, an electrical power source connected across the bridge, a temperature sensitive resistor having a high negative temperature coefficient of resistance interposed in an arm at one side of the bridge and responsive to temperature deflections in the temperature being controlled to vary the resistance of said arm relative to the other arms of the bridge and thereby unbalance the bridge, a temperature altering means including an actuator therefor for progressively adjusting the same to counteract the temperature deflections below and above a predetermined value of the temperature being controlled, a second resistor having a high negative temperature coefficient of resistance interposed in another arm at the same side of the bridge, a third such resistor interposed in an arm at the other side of the bridge, separately energized electrical heaters for applying heat to the second and third resistors to produce resistance variations therein to momentarily offset the resistance variations produced in said first resistor resulting from said temperature deflections, a first circuit closing means for the heater for applying heat to the second resistor, thereby reducing its resistance to offset a decrease in the resistance of the first mentioned resistor as a result of a temperature rise in the controlled temperature above said predetermined value, a second circuit closing means for energizing the heater for applying heat to the third resistor, thereby reducing its resistance to offset an increase in the resistance of the first resistor as a result of a temperature drop in the controlled temperature below said predetermined value, and means including an electronic switch energized during an unbalanced condition in the bridge for selectively connecting said circuit closing means with an output point of the bridge, whereby electrical heat is applied to one of said temperature sensitive resistors to momentarily rebalance the bridge.

6. A temperature control system according to claim 5 characterized by the provision of an electrically energized actuator operable in opposite directions for adjusting said temperature altering means to increase and decrease its effectiveness, one energizing circuit therefor being connected through the first circuit closing means and another energizing circuit therefor being connected through the second circuit closing means.

7. A temperature control system according to claim 6 in which the means activated by an unbalanced condition of the bridge to control said circuit closing means comprises an electronic network including a voltage amplifying tube and a pair of phase selector tubes, each being connected with said voltage amplifier and with one of said circuit closing means.

8. A temperature control system according to claim 7 in which the said phase selector tubes are connected in parallel with said voltage amplifying tube and 180° out of phase with respect to each other, whereby one selector tube is in phase with one side of the bridge and the other selector tube is in phase with the other side of the bridge.

9. A temperature control system according to claim 8 characterized by the provisions of connectors leading from one of said circuit closing means to one end of a transformer secondary winding, the other circuit closing means is electrically connected to the other end of the last mentioned secondary winding, and in that the last mentioned secondary winding and a similar winding for supplying power to the opposite sides of the bridge are wound on a common core.

10. A temperature control system according to claim 5 characterized by the provision of a variable resistor interposed in an arm of the bridge for varying the resistance thereof to predetermine the temperature at which the bridge will rebalance.

11. A temperature control system according to claim 10 characterized by the provision of means for selectively defining the upper and lower limits of a temperature control band within which band the movable control elements of the system remain fixed.

12. A temperature control system according to claim 11 characterized in that means for selectively defining the upper and lower limits of a temperature control band is a variable resistor interposed in a connection between the voltage amplifying tube and the selector tubes.

13. A temperature control system according to claim 11 characterized in that the bridge includes a pair of arms, each being provided with a resistor having like temperature coefficients of resistance and exposed to the influence of a temperature medium, one of said pair of resistors being shielded so as to lag in its response to abrupt temperature changes in said medium and thereby unbalance the bridge.

14. A temperature control system as defined in claim 13 characterized in that a conductor leads from a junction between the said pair of arms to said output point of the bridge and a variable resistor is interposed in the last mentioned conductor to prevent minor changes in the temperature media from activating the amplifier tube.

References Cited in the file of this patent

UNITED STATES PATENTS

| | | |
|---|---|---|
| 2,135,513 | Holven | Nov. 8, 1938 |
| 2,148,491 | Moore | Feb. 28, 1939 |
| 2,246,575 | Coleman | June 24, 1941 |
| 2,362,977 | Crosthwait | Nov. 21, 1941 |
| 2,547,933 | Fitzgerald | Apr. 10, 1951 |
| 2,574,925 | Lehane | Nov. 13, 1951 |
| 2,579,716 | Wilson | Dec. 25, 1951 |
| 2,603,422 | Sargeaunt | July 15, 1952 |